US008681165B2

(12) United States Patent
Choi et al.

(10) Patent No.: US 8,681,165 B2
(45) Date of Patent: Mar. 25, 2014

(54) IMAGE ROTATION METHOD AND APPARATUS

(75) Inventors: Jae Yong Choi, Gyeonggi-do (KR); Byong Suk Jeon, Gyeonggi-do (KR); Bum Suk Kim, Chungcheongnam-do (KR)

(73) Assignee: Samsung Electronics Co., Ltd (KR)

( * ) Notice: Subject to any disclaimer, the term of this patent is extended or adjusted under 35 U.S.C. 154(b) by 608 days.

(21) Appl. No.: 12/900,148

(22) Filed: Oct. 7, 2010

(65) Prior Publication Data

US 2011/0080428 A1 Apr. 7, 2011

(30) Foreign Application Priority Data

Oct. 7, 2009 (KR) ........................ 10-2009-0095321

(51) Int. Cl.

| | |
|---|---|
| *G06T 1/60* | (2006.01) |
| *G09G 5/39* | (2006.01) |
| *G06F 13/28* | (2006.01) |
| *G06F 13/00* | (2006.01) |

(52) U.S. Cl.

USPC ........... 345/540; 345/530; 345/686; 345/531; 345/533; 345/537

(58) Field of Classification Search

USPC .................................................. 345/530–563

See application file for complete search history.

(56) References Cited

U.S. PATENT DOCUMENTS 7,511,722 B1 3/2009 Ollmann

*Primary Examiner* — Aaron M Richer

*Assistant Examiner* — Robert Craddock

(74) *Attorney, Agent, or Firm* — The Farrell Law Firm, P.C.

(57) ABSTRACT

Provided is an image rotation method and apparatus for rotating an original image of $2^n \times 2^n$ pixels when n is a natural number greater than 1, including loading each row of pixels of the original image into a corresponding load memory vector; and, after the load step, for at least one iteration, performing a transposition operation for each matched load memory vector after matching the load memory vectors and, for zero or more iterations, an interleaving operation between each matched load memory vector after matching the load memory vectors, while the transposition step and the interleaving step are performed a total of n iterations.

18 Claims, 6 Drawing Sheets

IMAGE ROTATION METHOD AND APPARATUS

PRIORITY

This application claims priority under 35 U.S.C. §119(a) to Korean Patent Application No. 10-2009-0095321, which was filed in the Korean Intellectual Property Office on Oct. 7, 2009, the disclosure of which is incorporated herein in its entirety by reference.

BACKGROUND OF THE INVENTION

1. Field of the Invention

The present invention relates generally to an image rotation method and apparatus.

2. Description of the Related Art

Due to new developments in Information Technology, portable terminals have evolved into instruments having both call functionality and various multimedia functionalities. As users require higher quality multimedia functionality, the amount of multimedia data that the portable terminal has to process rapidly increases. Accordingly, for high-capacity multimedia data to be rapidly processed, the speed of image processing needs to increase.

Portable terminals are frequently small in size and used by being held in the hand of the user. However, a problem arises, when the screen of the portable terminal tilts and the user cannot fully see the screen, which can be solved through image rotating technology. Single Instruction Multiple Data (SIMD) processing technology is technology capable of processing multiple data, one command at a time, improving data processing speed, as compared to the existing mode of processing data, one data per one command. Accordingly, data processing speed of multimedia, particularly image rotation, can be improved by using SIMD technology. However, since SIMD technology can only process consecutive data, the general method does not exhibit improved performance for 90 degree or 270 degree image rotation. Hence, an effective method for applying SIMD technology to image rotation is required.

SUMMARY OF THE INVENTION

The present invention has been made in view of at least the above-described problems, and provides a fast and effective image rotation method and apparatus.

In accordance with an aspect of the present invention, an image rotation method for rotating an original image of $2^n \times 2^n$ pixels, when n is a natural number greater than 1, includes loading each row of pixels of the original image into a corresponding load memory vector; and, after the load step, which includes matching each load memory vector with a load memory vector which is delayed as much as $2^{n-2}$ from the most precedent load memory vector and performing, at least one iteration, transposing each matched load memory vector after matching the load memory vectors and interleaving, for zero or more iterations, interleaving between each matched load memory vector after matching the load memory vectors, while the transposition step and the interleaving step are performed a total of n iterations.

Furthermore, the operation step includes an interleaving repetition step, after the load step, of n−1 iterations, an interleaving step of matching each load memory vector with a load memory vector which is delayed as much as $2^{n-2}$ from the most precedent load memory vector and performing an interleaving operation between the matched load memory vector; and a transposition step, after the interleaving repetition step, of performing a transposition operation of matching each load memory vector with a load memory vector which is delayed as much as $2^{n-2}$ from the most precedent load memory vector and performing the transposition operation for each matched load memory vector.

The operation step also includes a transposition repetition step, after the load step, of repeating a transposition step of matching each load memory vector with a load memory vector which is delayed as much as $2^k$ from the most precedent load memory vector and performing a transposition operation between the matched load memory vector. As the transposition step is repeated, k is initialized to 0 and increased by 1 with each iteration of the transposition step. The iteration of the transposition step is stopped after performing the transposition operation having k=n−1.

The operation step also includes an interleaving step, after the load step, of matching each load memory vector with an immediately successive load memory vector from the most precedent load memory vector and performing an interleaving operation between the matched load memory vector; and a transposition repetition step, after the interleaving step, of repeating a transposition step of matching each load memory vector with a load memory vector which is delayed as much as $2^k$ from the most precedent load memory vector and performing a transposition operation between the matched load memory vector. As the transposition step is repeated, k is initialized to 1 and increased by 1 with each iteration of the transposition step. The iteration of the transposition step is stopped after performing the transposition operation having k=n−1. In the operation step, the transposition operation is performed with a unit size of $2^{n-1}$.

In accordance with another aspect of the present invention, an image rotation method for rotating an original image of $2^n \times 2^n$ pixels when n is a natural number greater than 1 further includes storing the load memory vector in reverse order after the operation step or between the load step and the operation step. The transposition of a first transposition memory vector and a second transposition memory vector swaps and stores the second memory element of a memory element pair of arbitrary location of the first transposition memory vector with the first memory element of the memory element pair of location corresponding to the arbitrary location of the second transposition memory vector, when each memory vector is a vector which includes $2^n$ memories that store pixel data, a memory element is a collection of memory dividing a memory vector by size unit corresponding to a unit size 2i (i is an integer ranging from 0 less than n), and a memory element pair is a memory element paired in order.

The interleaving operation of a first interleaving memory vector and a second interleaving memory vector inserts pixel data of each memory of a corresponding location of the second interleaving memory vector behind the pixel data of each memory of the first interleaving memory vector and storing over the first interleaving memory vector and the second interleaving memory vector. A load memory vector which is already matched with another load memory vector is not matched again with the other load memory vector in each interleaving step, and a load memory vector which is already matched with another load memory vector is not matched again with the other load memory vector in the transposition step.

In accordance with another aspect of the present invention, an image rotation apparatus for rotating an original image of $2^n \times 2^n$ pixels when n is a natural number which is greater than 1 includes a load memory vector storing each row of pixels of the original image; and a controller performing, at least one iteration, a transposition step of performing transposition operation for each matched load memory vector after matching the load memory vectors and performing an interleaving step of performing, zero or more iterations, interleaving operation between each matched load memory vector after matching the load memory vectors, while the transposition step and the interleaving step are performed total n iterations, after the pixels of the original image is stored in the load memory vector.

The controller includes an interleaving operation unit repeating n−1 iterations an interleaving step of matching each load memory vector with a load memory vector which is delayed as much as $2^{n-2}$ from the most precedent load memory vector and performing an interleaving operation between the matched load memory vector, after the pixels of the original image is stored in the load memory vector; and a transposition operation unit performing transposition operation of matching each load memory vector with a load memory vector which is delayed as much as $2^{n-2}$ from the most precedent load memory vector and performing transposition operation for each matched load memory vector, after the interleaving operation of the interleaving operation unit is repeated n−1 iterations.

The controller includes a transposition operation unit repeating, after the load step, a transposition step of matching each load memory vector with a load memory vector which is delayed as much as $2^k$ from the most precedent load memory vector and performing transposition operation between the matched load memory vector. As the transposition step is repeated, k is initialized to 0 and increased by 1 with each iteration of the transposition step. The iteration of the transposition step stops after performing the transposition operation having k=n−1.

The controller includes an interleaving operation unit matching each load memory vector with an immediately successive load memory vector from the most precedent load memory vector and performing an interleaving operation between the matched load memory vector, after the load step; and a transposition operation unit repeating a transposition step of matching each load memory vector with a load memory vector which is delayed as much as $2^k$ from the most precedent load memory vector and performing transposition operation between the matched load memory vector. As the transposition step is repeated k is initialized to 1 and increased by 1 with each iteration of the transposition step, after the interleaving step. The iteration of transposition step stops after performing the transposition operation having k=n−1. The controller performs the transposition operation with a unit size $2^{n-1}$.

BRIEF DESCRIPTION OF THE DRAWINGS

The objects, features and advantages of the present invention will be more apparent from the following detailed description in conjunction with the accompanying drawings, in which.

DETAILED DESCRIPTION OF EMBODIMENTS OF THE PRESENT INVENTION

Various embodiments of the present invention are described in detail below with reference to the accompanying drawings. The same reference numbers are used throughout the drawings to refer to the same or like parts. In addition, detailed descriptions of well-known functions and structures incorporated herein may be omitted to avoid obscuring the subject matter of the present invention.

Figure 1:
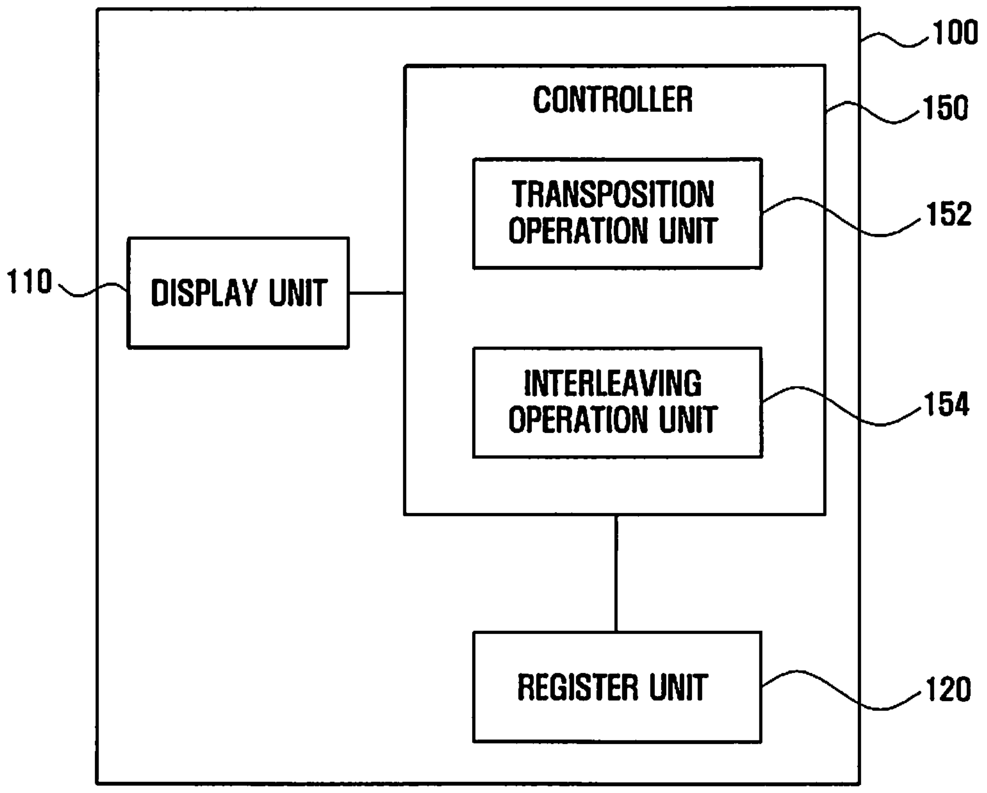
FIG. 1 is a block diagram illustrating a configuration of an image rotation apparatus according to an embodiment of the present invention.

FIG. 1 is a block diagram illustrating a configuration of an image rotation apparatus 100 according to an embodiment of the present invention.

Referring to FIG. 1, the image rotation apparatus 100 according to an embodiment of the present invention includes a display unit 110, a register unit 120 and a controller 150. The display unit 110 displays images under the control of the controller 150. The display unit 110 can output screen data, generated when performing the function of the image rotation apparatus 100 and status information, according to the key operation and function setting of a user. Moreover, the display unit 110 can visually display various signals and color information outputted from the controller 150. This display unit 110 can be a Liquid Crystal Display (LCD) or an Organic Light-Emitting Diode (OLED) display.

The register unit 120 includes at least one register. The register refers to a part temporarily storing a value for the operation of the controller 150. The hardware is usually configured of a high-speed flip-flop. The controller 150 performs addition, subtraction, multiplication, division or logic operation after once storing data into the register from the general-purpose memory. In case of the Input-Output (I/O) operation, data is once stored into the register. In terms of software, the presence of the register is not necessary to be known in a high level programming language. In assembly language, which is a low level programming language, a register looks like a variable. Normally, the controller 150 has a plurality of registers but the available register is limited by the processing type of the controller 150. A base register and an index register refer to units for assigning the address of an accumulator or an accumulation memory frequently used in operation processing or I/O processing. An accumulator or an accumulation memory is a register in which intermediate arithmetic and logic results are stored. A program counter indicating the location of a program in execution or a flag indicating the internal state of the controller 150 is also one of the registers.

Particularly, in the present embodiment, data is stored in the register so as to perform the SIMD operation that the controller 150 performs. In the present embodiment, the register unit 120 was used as storing room for the SIMD operation of the controller 150, but other data storage units can be used in place of the register unit 120. The controller 150 controls the display unit 110 to display the image rotated by the embodiment of the present invention. Moreover, the controller 150 may include a transposition operation unit 152 and an interleaving operation unit 154. The interleaving operation unit 154 performs interleaving operation.

Figure 2:
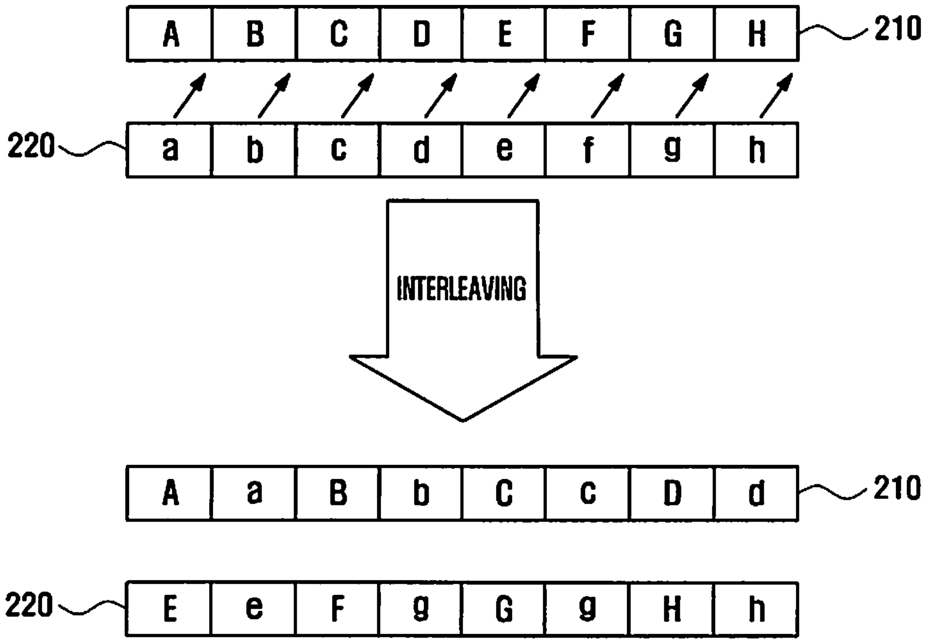
FIG. 2 is a diagram illustrating an interleaving operation.

FIG. 2 is a diagram illustrating an interleaving operation.

Hereinafter, pixel data refers to data for indicating the color of one pixel of an image. For example, the red-green-blue (RGB) color model has 256 available colors and can display colors such as 0x000000 (black) and 0xFFFFFF (white) with the size of 8 bits. Other types of color models include the Hue, Saturation and Value (HSV) type, the Hue, Saturation and Lightness (HSL) type and the Cyan-Magenta-Yellow-Black (CMYK) type. However, the application of the present invention does not depend on the type of color model used to express the color of a pixel. Accordingly, the present invention can be applied regardless of the type of color model used.

Hereinafter, it is assumed that the memory vector is a vector including $2^n$ memory storing pixel data. Here, N is a natural number that is greater than 1. The register of the register unit 120 includes a memory vector. That is, each memory forming a memory vector is included in the register. The interleaving operation of a first memory vector and a second memory vector is an operation that inserts pixel data of each memory of a corresponding location of the second memory vector behind the pixel data of each memory of the first memory vector and storing over the first memory vector and the second memory vector.

FIG. 2 shows the state of two memory vectors 210, 220 before the interleaving operation (above the arrow) and the state after the interleaving operation (below the arrow). This memory vector example has $2^n$ memory of n=3 with each memory vector including 8 (=$2^3$) memory blocks. In each memory vector, each block in which A through H and a through h are displayed, is one memory, and each block stores data for displaying one pixel. The letter displayed in each block indicates data stored in the memory corresponding to the block.

That is, 'a' is data of the first memory of the second memory vector 220 before interleaving is inserted behind 'A' which is data of the first memory of the first memory vector 210 before interleaving, while 'b' is data of the second memory of the second memory vector 220 before interleaving is inserted behind 'B' which is data of the second memory of the first memory vector 210 before interleaving. The data is inserted through such a method for the rest of the memories so that the data becomes the same state as the first memory vector 210 and the second memory vector 220 after interleaving.

The operation of interleaving, illustrated with n=3 above, can also be performed for two memory vectors having $2^n$ memories with respect to any arbitrary natural number greater than 1. A system supporting the interleaving operation with the SIMD method can rapidly perform the interleaving operation for two memory vectors. Currently, the size of the memory vector is determined according to the size limitation of the data which supports the SIMD processing technology.

According to another embodiment of the present invention, image rotation is sometimes only possible through a transposition operation without the interleaving operation in which case the image rotation apparatus 100 may not include the interleaving operation unit 154. The transposition operation unit 152 performs the transposition operation.

Herein, the transposition operation of the first memory vector and the second memory vector refers to an operation that swaps and stores the second memory element of a memory element pair of arbitrary location of the first memory vector with the first memory element of the memory element pair of location corresponding to the arbitrary location of the second memory vector when an unit size $2^i$ (i is an integer ranging from 0 to less than n) is given. The unit size refers to the number of memory blocks being treated as one element (lump) in the transposition operation. The memory element refers to the collection of memory blocks dividing the memory vector by size unit corresponding to a unit size.

Figure 3:
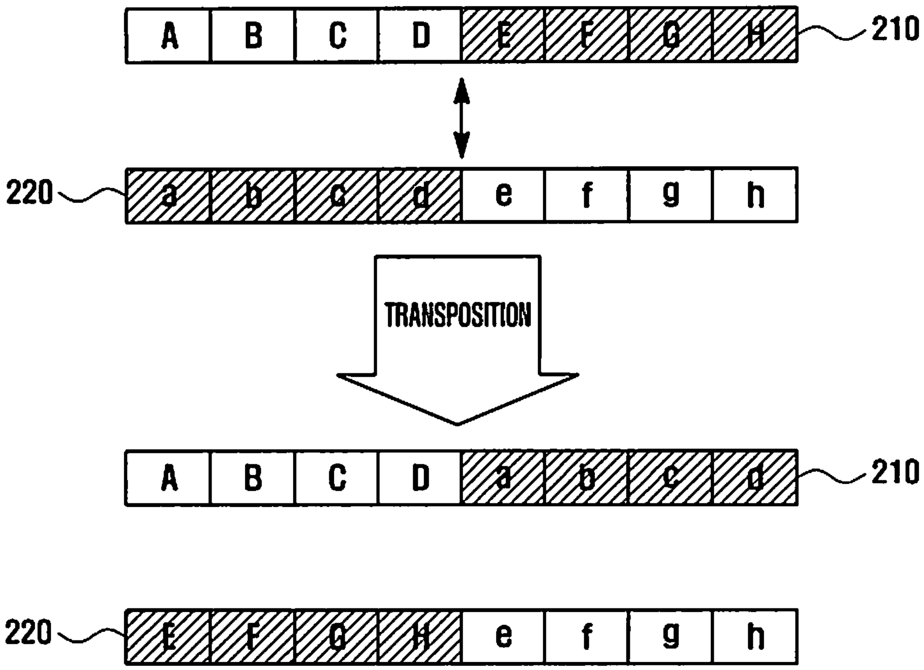
FIGS. 3 to 5 illustrate a transposition operation.
Figure 4:
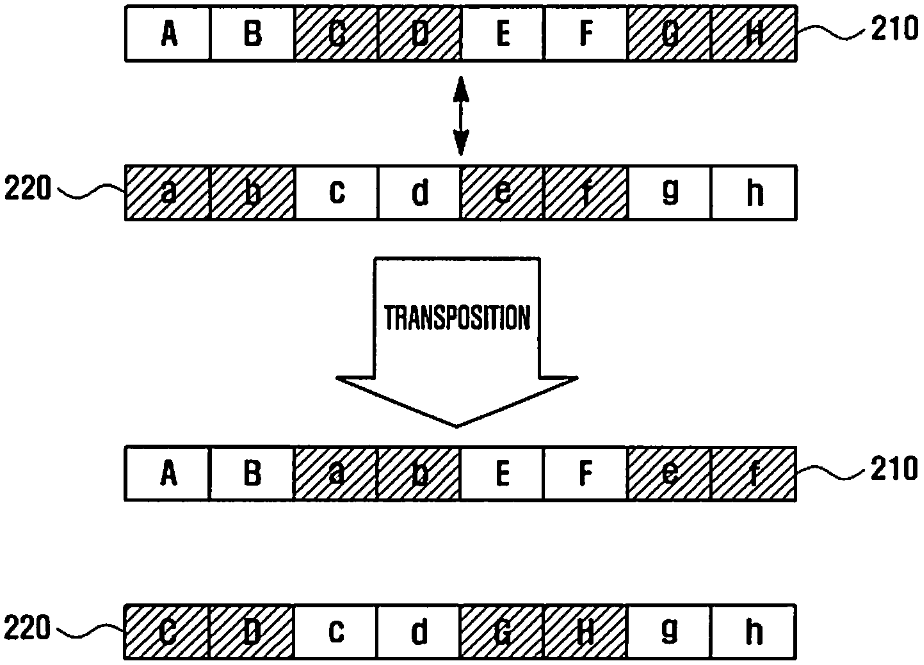
Figure 5:
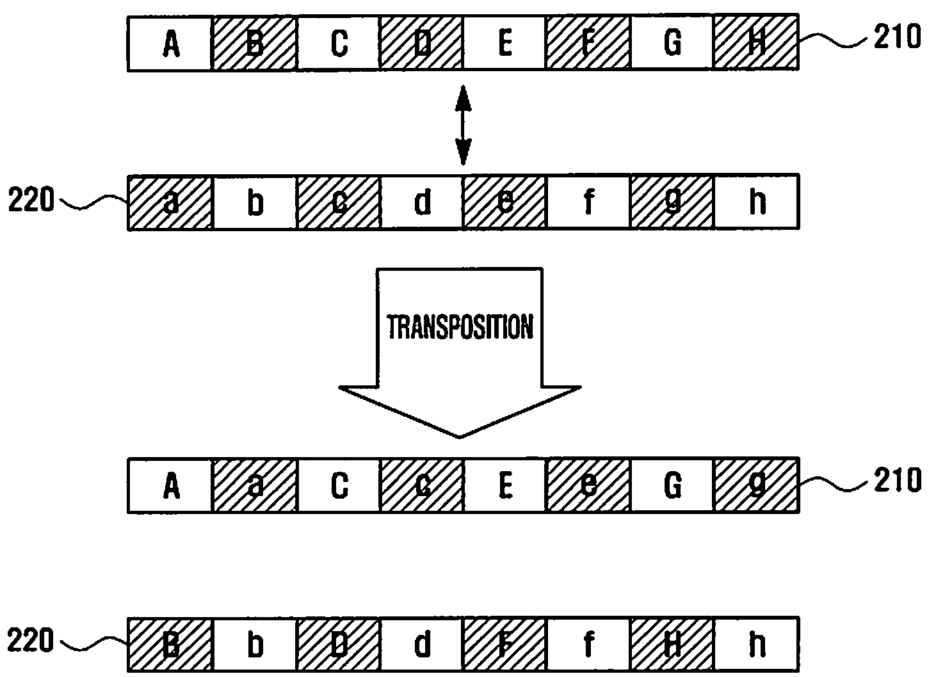

FIGS. 3 to 5 illustrate a transposition operation.

Each memory vector in FIGS. 3 to 5 includes $2^3$ memories. The unit size refers to the number of memory being treated as one element (lump) in the transposition operation. The transposition operation between two memory vectors may have different results according to a given unit size. When the size of each transposition memory vector, that is, the number of memory that each transposition memory vector contains is $2^n$, the unit size can be given with $2^i$ (i is an integer ranging from 0 to less than n).

In FIG. 3, the unit size is 4 (=$2^2$). In FIG. 4, the unit size is 2 (=$2^1$). In FIG. 5, the unit size is 1 (=$2^0$). The memory element refers to the collection of memory blocks dividing the memory vector by size unit corresponding to unit size. In FIG. 3, since the unit size is 4, when the first memory vector 210 is divided by 4 units, four memory blocks including four data of 'A','B','C','D' become one memory element, and four memory blocks including four data of 'E','F','G','H' become another memory element.

In FIGS. 3 to 5, shading is used to easily differentiate memory elements to be displayed. In FIGS. 3 to 5, the memory of each memory vector is classified according to the memory element to be displayed as follows. For convenience' sake, each memory block is distinguished by using data stored in each memory. Memory blocks enclosed in parenthesis '( )' form one memory element.

In FIG. 3, the unit size is 4 and the first memory vector 210 before the transposition operation is divided into (A, B, C, D)/(E, F, G, H), and the second memory vector 220 before the transposition operation is divided into (a, b, c, d)/(e, f, g, h). In FIG. 4, the unit size is 2 and the first memory vector 210 before the transposition operation is divided into (A,B)/(C, D)/(E,F)/G,H), and the second memory vector 220 before the transposition operation is divided into (a,b)/(c,d)/(e,f)/(g,h).

In FIG. 5, the unit size is 1 and the first memory vector 210 before the transposition operation is divided into (A)/(B)/(C)/(D)/(E)/(F)/(G)/(H), and the second memory vector 220 before the transposition operation is divided into (a)/(b)/(c)/(d)/(e)/(f)/(g)/(h). Herein, the memory element pair means that the memory element is paired in order. For convenience, each memory block is distinguished by using the data stored in each memory. Memory blocks enclosed in parentheses '( )' form one memory element while memory elements enclosed in braces '{ }' form a memory element pair.

In FIG. 3, the unit size is 4 and the first memory vector 210 before the transposition operation is divided into {(A, B, C, D),(E, F, G, H)}, and the second memory vector 220 before the transposition operation is divided into {(a, b, c, d),(e, f, g, h)}. In FIG. 4, the unit size is 2 and the first memory vector 210 before the transposition operation is divided into {(A,B),(C,D)/(E,F),(G,H)}, and the second memory vector 220 before the transposition operation is divided into {(a,b),(c,d)}/{(e,f),(g,h)}.

In FIG. 5, the unit size is 1 and the first memory vector 210 before the transposition operation is divided into {(A),(B)}/{(C),(D)}/{(E),(F)}/{(G),(H)}, and the second memory vector 220 before the transposition operation is divided into {(a),(b)}/{(c),(d)}/{(e),(f)}/{(g),(h)}.

Herein, the transposition operation of the first memory vector and the second memory vector refers to an operation that swaps and stores the second memory element of a memory element pair of arbitrary location of the first memory vector with the first memory element of the memory element pair of location corresponding to the arbitrary location of the second memory vector when a unit size 2i (i is an integer ranging from 0 less than n) is given.

For example, in FIG. 3, the memory element pair of the location corresponding to {(A,B,C,D),(E,F,G,H)} is {(a, b, c, d),(e, f, g, h)}. Accordingly, when the transposition operation is performed, (E,F,G,H), the data stored in the second memory element of the memory element pair of the first memory vector 210 and (a, b, c, d), the data stored in the first memory element of the memory element pair of the second memory vector 220 are swapped.

Consequently, the first memory vector 210 changes from the state before the transposition operation (above the arrow) to the state after the transposition operation (below the arrow). Moreover, the second memory vector 220 changes from the state before the transposition operation (above the arrow) to the state after the transposition operation (below the arrow).

Similarly, in FIGS. 4 and 5, illustrate the transposition operation performed according to unit size. Consequently, the first memory vector 210 changes from the state before the transposition operation (above the arrow) to the state after the transposition operation (below the arrow). Moreover, the second memory vector 220 changes from the state before the transposition operation (above the arrow) to the state after the transposition operation (below the arrow). The transposition operation, illustrated with n=3 above, can also be performed with respect to two memory vectors having $2^n$ memories for any arbitrary natural number greater than 1.

A system supporting the transposition operation of the SIMD type can rapidly perform the transposition operation for two memory vectors. Currently, the size of the memory vector is determined according to the size limitation of the data which supports the SIMD processing technology. However, certain systems only support the transposition operation having a type like FIG. 3. That is, such systems cannot separately designate the unit size with respect to two memory vectors having $2^n$ memories for an arbitrary natural number greater than 1 and support only the transposition operation having a unit size $2^{n-1}$. In this case, since the transposition operation of FIGS. 4 and 5 is not supported by the SIMD type, image rotation should be implemented not using the transposition operation of FIGS. 4 and 5.

Figure 6:
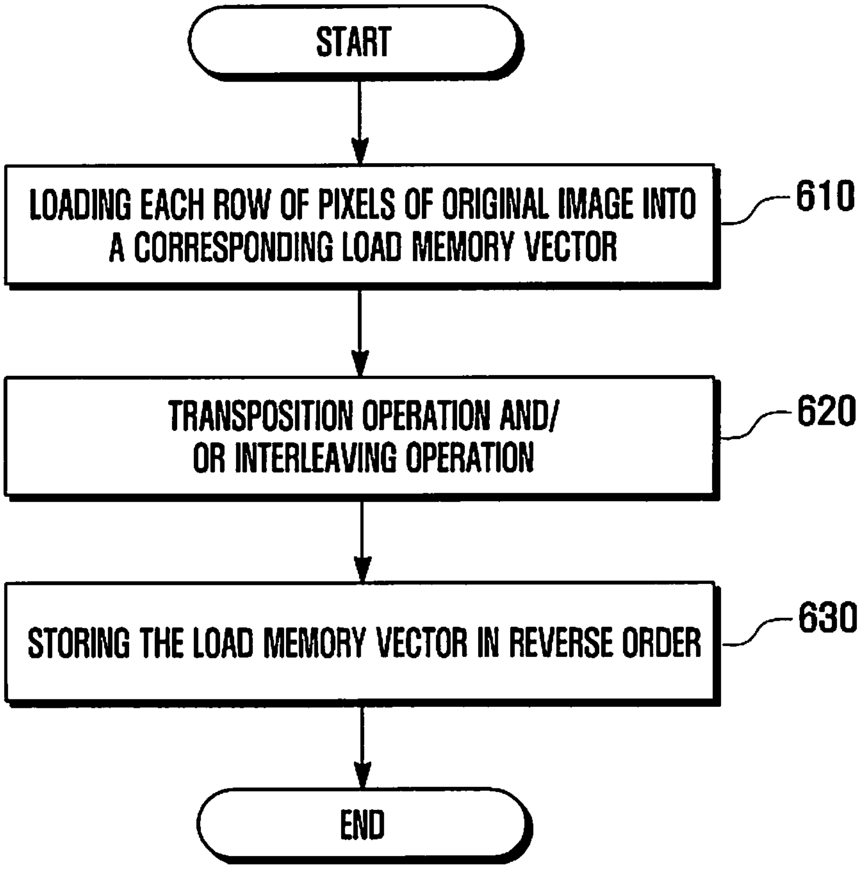
FIG. 6 is a flowchart illustrating an image rotation process according to an embodiment of the present invention.

FIG. 6 is a flowchart illustrating an image rotation process according to an embodiment of the present invention.

Referring to FIG. 6, the image rotation apparatus 100 loads each row of pixel of original image into a corresponding load memory vector in step 610. The load memory vector refers to a vector of memory into which image pixel data is loaded. It is assumed that the original image has $2^n \times 2^n$ (n is a natural number greater than 1). The original image can be loaded in the load memory vector as in Table 1. At this time, the size of the memory vector is determined according to the size limitation of data which supports the SIMD processing technology. For example, when the SIMD is supported to be used for a memory vector which includes $2^8$ pixel data, in the size of the memory vector, the rotatable original image can be $2^8 \times 2^8$.

memory vector, data of the first (e.g., leftmost) pixel among the pixels of the first row of the original image is loaded, while data of the second (e.g., second from the left) pixel among the pixels of the first row of the original image is loaded in the second memory of the first memory vector. Thus, pixel data corresponding to the original image is loaded into each memory.

Similarly, in the second memory vector, pixel data of the second row (assuming that it starts from the top) of the original image is loaded. In the same manner, pixel data of a corresponding row is loaded in each memory vector. The order of the memory vector can be set identically with the order of the row when it is counted from the top of the original image, and can be set identically with the order of the row when it is counted from the bottom of the original image. In any case, the same rule is applied to load an image, and the loaded image is displayed to the display unit 110. However, hereinafter, for convenience, it is assumed that the order of the memory vector is identical with the order of the row when it is counted from the top of the original image.

The order of memory of the memory vector can be set identically with the order when it is counted from the left of the pixel in each corresponding row of the original image, or can be set identically with the order when it is counted from the right of the pixel in each corresponding row of the original image. However, hereinafter, for convenience, it is assumed that the order of memory of the memory vector is identical with the order of pixel when it is counted from the left of each corresponding row of the original image. That is, it is assumed that the location in Table 1 is identical with the actual location of pixels displayed in the display unit 110.

The load memory vector is arranged as described above. The load memory vector is delayed as much as i from another memory vector, when one load memory vector is lower as much as i rows than another memory vector by as much as a row when the load memory vector is expressed as in Table 1. That is, it is delayed by the difference of the sequence number when sequence number is given in order. Moreover, the most precedent load memory among the load memory vector refers to a load memory vector located uppermost when load memory vector is expressed like Table 1. That is, the first vector among the load memory vector is the most precedent load memory vector.

In the description of Table 1 above, an image having 8×8 pixels was used as an example, but it is clear to those skilled in the art that an image having $2^n \times 2^n$ pixels for any arbitrary

TABLE 1

| | | | | | | | | |
|---|---|---|---|---|---|---|---|---|
| First memory vector | P00 | P01 | P02 | P03 | P04 | P05 | P06 | P07 |
| Second memory vector | P10 | P11 | P12 | P13 | P14 | P15 | P16 | P17 |
| Third memory vector | P20 | P21 | P22 | P23 | P24 | P25 | P26 | P27 |
| Fourth memory vector | P30 | P31 | P32 | P33 | P34 | P35 | P36 | P37 |
| Fifth memory vector | P40 | P41 | P42 | P43 | P44 | P45 | P46 | P47 |
| Sixth memory vector | P50 | P51 | P52 | P53 | P54 | P55 | P56 | P57 |
| Seventh memory vector | P60 | P61 | P62 | P63 | P64 | P65 | P66 | P67 |
| Eighth memory vector | P70 | P71 | P72 | P73 | P74 | P75 | P76 | P77 |

In the memory vectors of Table 1, the original image of 8×8(n=3) pixels is loaded. In the first memory vector, pixel data of the first row (assuming that it starts from the top) of the original image is loaded. In the first memory of the first natural number n greater than 1 can be loaded in $2^n$ memory vectors in which each memory vector has $2^n$ memories in the same manner. The controller 150 performs transposition and/or interleaving in step 620. There exist three embodiments of step 620. As described above, it is assumed that the original image has $2^n \times 2^n$ pixels (n being a natural number greater than 1).

The first embodiment is a method for performing the transposition operation in n iterations. The second embodiment is a method for performing transposition operation once after performing interleaving operation in n−1 iterations. The third embodiment is a method for performing the transposition operation n−1 iterations after performing the interleaving operation once.

Firstly, according to the first embodiment of the present invention, the transposition step iterations include matching each load memory vector with the load memory vector which is delayed as much as unit size from the most precedent load memory vector, and performing the transposition operation between the matched load memory vector.

At this time, the load memory vector which is already matched with another load memory vector is not matched again with the other load memory vector. Moreover, the unit size is $2^k$. When the transposition step is repeated, k starts with 0 at first and increases by 1 whenever the transposition step is repeated, and the iteration of the transposition step is paused after the transposition operation with k=n−1 is performed, as briefly illustrated in Table 2.

TABLE 2

| | |
|---|---|
| Step 1 | Transposition operation with unit size $2^0$ by matching vector below $2^0$ |
| Step 2 | Transposition operation with unit size $2^1$ by matching vector below $2^1$ |
| Step 3 | Transposition operation with unit size $2^2$ by matching vector below $2^2$ |
| . . . | . . . |
| Step n | Transposition operation with unit size $2^{n-1}$ by matching vector below $2^{n-1}$ |

Table 3 illustrates when n=3 in Table 2 (i.e., when applied to data of Table 1).

TABLE 3

| | |
|---|---|
| Step 1 | Transposition operation with unit size $2^0$ by matching vector below $2^0$ |
| Step 2 | Transposition operation with unit size $2^1$ by matching vector below $2^1$ |
| Step 3 | Transposition operation with unit size $2^2$ by matching vector below $2^2$ |

Step 1 of Table 3 performs, with unit size 1, the transposition operation between the first load memory vector and the second load memory vector, the transposition operation between the third load memory vector and the fourth load memory vector, the transposition operation between the fifth load memory vector and the sixth load memory vector, and the transposition operation between the seventh load memory vector and the eighth load memory vector. In other words, the transposition operation is performed by matching a load memory vector with a counterpart which is smaller by as much as one. Table 4 illustrates the state of the load memory vector state after performing step 1 of Table 3.

TABLE 4

| | | | | | | | | |
|---|---|---|---|---|---|---|---|---|
| First memory vector | P00 | P10 | P20 | P30 | P02 | P12 | P22 | P32 |
| Second memory vector | P01 | P11 | P21 | P31 | P03 | P13 | P23 | P33 |
| Third memory vector | P04 | P14 | P24 | P34 | P06 | P16 | P26 | P36 |
| Fourth memory vector | P05 | P15 | P25 | P35 | P07 | P17 | P27 | P37 |
| Fifth memory vector | P40 | P50 | P60 | P70 | P42 | P52 | P62 | P72 |
| Sixth memory vector | P41 | P51 | P61 | P71 | P43 | P53 | P63 | P73 |
| Seventh memory vector | P44 | P54 | P64 | P74 | P46 | P56 | P66 | P76 |
| Eighth memory vector | P45 | P55 | P65 | P75 | P47 | P57 | P67 | P77 |

Step 2 of Table 3 performs, with unit size 2, the transposition operation between the first load memory vector and the third load memory vector, the transposition operation between the second load memory vector and the fourth load memory vector, the transposition operation between the fifth load memory vector and the seventh load memory vector, and the transposition operation between the sixth load memory vector and the eighth load memory vector. Table 5 illustrates the load memory vector state after performing step 2 of Table 3.

TABLE 5

| | | | | | | | | |
|---|---|---|---|---|---|---|---|---|
| First memory vector | P00 | P10 | P20 | P30 | P04 | P14 | P24 | P34 |
| Second memory vector | P01 | P11 | P21 | P31 | P05 | P15 | P25 | P35 |
| Third memory vector | P02 | P12 | P22 | P32 | P06 | P16 | P26 | P36 |
| Fourth memory vector | P03 | P13 | P23 | P33 | P07 | P17 | P27 | P37 |
| Fifth memory vector | P40 | P50 | P60 | P70 | P44 | P54 | P64 | P74 |
| Sixth memory vector | P41 | P51 | P61 | P71 | P45 | P55 | P65 | P75 |
| Seventh memory vector | P42 | P52 | P62 | P72 | P46 | P56 | P66 | P76 |
| Eighth memory vector | P43 | P53 | P63 | P73 | P47 | P57 | P67 | P77 |

Step 3 of Table 3 performs, with unit size 4, the transposition operation between the first load memory vector and the fifth load memory vector, the transposition operation between the second load memory vector and the sixth load memory vector, the transposition operation between the third load memory vector and the seventh load memory vector, and the transposition operation between the fourth load memory vector and the eighth load memory vector. Table 6 illustrates the load memory vector state after performing step 3 of Table 3.

TABLE 6

| | | | | | | | | |
|---|---|---|---|---|---|---|---|---|
| First memory vector | P00 | P10 | P20 | P30 | P40 | P50 | P60 | P70 |
| Second memory vector | P01 | P11 | P21 | P31 | P41 | P51 | P61 | P71 |
| Third memory vector | P02 | P12 | P22 | P32 | P42 | P52 | P62 | P72 |
| Fourth memory vector | P03 | P13 | P23 | P33 | P43 | P53 | P63 | P73 |
| Fifth memory vector | P04 | P14 | P24 | P34 | P44 | P54 | P64 | P74 |
| Sixth memory vector | P05 | P15 | P25 | P35 | P45 | P55 | P65 | P75 |
| Seventh memory vector | P06 | P16 | P26 | P36 | P46 | P56 | P66 | P76 |
| Eighth memory vector | P07 | P17 | P27 | P37 | P47 | P57 | P67 | P77 |

Referring to FIG. 6, the image rotation apparatus 100 stores the load memory vector in reverse order in step 630. That is, the upward and downward order of the load memory vector of Table 6 are exactly reversed and stored again. Table 7 illustrates the load memory vector state after performing step 630.

TABLE 7

| | | | | | | | | |
|---|---|---|---|---|---|---|---|---|
| First memory vector | P07 | P17 | P27 | P37 | P47 | P57 | P67 | P77 |
| Second memory vector | P06 | P16 | P26 | P36 | P46 | P56 | P66 | P76 |
| Third memory vector | P05 | P15 | P25 | P35 | P45 | P55 | P65 | P75 |
| Fourth memory vector | P04 | P14 | P24 | P34 | P44 | P54 | P64 | P74 |
| Fifth memory vector | P03 | P13 | P23 | P33 | P43 | P53 | P63 | P73 |
| Sixth memory vector | P02 | P12 | P22 | P32 | P42 | P52 | P62 | P72 |
| Seventh memory vector | P01 | P11 | P21 | P31 | P41 | P51 | P61 | P71 |
| Eighth memory vector | P00 | P10 | P20 | P30 | P40 | P50 | P60 | P70 |

Table 7 illustrates the state of the load memory vector for the original image of Table 1 rotated by 90 degrees. When an image is displayed to the display unit 110 according to pixel data stored in Table 7, an image which is obtained by rotating the original image counterclockwise by 90 degrees can be displayed. Since many CPUs have a smaller CPU clock time required for the transposition operation in comparison with the interleaving operation, the image rotation by such a manner can be usefully used. The size of the image in this example is 8×8 but as explained in the first embodiment, but it is clear to those skilled in the art that any original image of $2^n \times 2^n$ for all natural n greater than one may be used.

The second embodiment is described in detail below.

Firstly, in an interleaving repetition step, the interleaving operation unit 154 performs n−1 iterations of matching each load memory vector with the load memory vector which is delayed as much as $2^{n-2}$ from the most precedent load memory vector, and performing the interleaving operation between the matched load memory vector. At this time, the load memory vector which is matched with another load memory vector is not matched again with the other load memory vector. Then, in the transposition step, each load memory vector is matched with the load memory vector which is delayed as much as unit size from the most precedent load memory vector, and the transposition operation between the matched load memory vector is performed. At this time, the load memory vector which is already matched with another load memory vector is not matched again with the other load memory vector. The unit size is $2^{n-1}$.

Table 8 shows the process of rotating the original image of $2^n \times 2^n$ according to the second embodiment of the present invention.

TABLE 8

| | |
|---|---|
| Step 1 | interleaving operation by matching vector below $2^{n-2}$ |
| Step 2 | interleaving operation by matching vector below $2^{n-2}$ |
| . . . | . . . |
| Step n − 1 | interleaving operation by matching vector below $2^{n-2}$ |
| Step n | transposition operation with unit size $2^{n-1}$ by matching vector below $2^{n-1}$ |

Table 9 illustrates when n=3 in Table 8 (i.e., when applied to data of Table 1).

TABLE 9

| | |
|---|---|
| Step 1 | interleaving operation by matching vector below $2^1$ |
| Step 2 | interleaving operation by matching vector below $2^1$ |
| Step 3 | transposition operation with unit size $2^2$ by matching vector below $2^2$ |

Step 1 of Table 9 performs the interleaving operation between the first load memory vector and the third load memory vector, the interleaving operation between the second load memory vector and the fourth load memory vector, the interleaving operation between the fifth load memory vector and the seventh load memory vector, and the interleaving operation between the sixth load memory vector and the eighth load memory vector. In other words, the interleaving operation is performed by matching a load memory vector with a counterpart which is smaller as much as two. Table 10 illustrates the load memory vector state after performing step 1 of Table 9 with respect to the data of Table 1.

TABLE 10

| | | | | | | | | |
|---|---|---|---|---|---|---|---|---|
| First memory vector | P00 | P20 | P01 | P21 | P02 | P22 | P03 | P23 |
| Second memory vector | P04 | P24 | P05 | P25 | P06 | P26 | P07 | P27 |
| Third memory vector | P10 | P30 | P11 | P31 | P12 | P32 | P13 | P33 |
| Fourth memory vector | P14 | P34 | P15 | P35 | P16 | P36 | P17 | P37 |

TABLE 10-continued

| | | | | | | | | |
|---|---|---|---|---|---|---|---|---|
| Fifth memory vector | P40 | P60 | P41 | P61 | P42 | P62 | P43 | P63 |
| Sixth memory vector | P44 | P64 | P45 | P65 | P46 | P66 | P47 | P67 |
| Seventh memory vector | P50 | P70 | P51 | P71 | P52 | P72 | P53 | P73 |
| Eighth memory vector | P54 | P74 | P55 | P75 | P56 | P76 | P57 | P77 |

Step 2 of Table 9 performs the interleaving operation between the first load memory vector and the third load memory vector, the interleaving operation between the second load memory vector and the fourth load memory vector, the interleaving operation between the fifth load memory vector and the seventh load memory vector, and the interleaving operation between the sixth load memory vector and the eighth load memory vector. In other words, the interleaving operation is performed by matching a load memory vector with a counterpart which is smaller as much as two. Table 11 illustrates the load memory vector state after performing step 2 of Table 9.

TABLE 11

| | | | | | | | | |
|---|---|---|---|---|---|---|---|---|
| First memory vector | P00 | P10 | P20 | P30 | P01 | P11 | P21 | P31 |
| Second memory vector | P02 | P12 | P22 | P32 | P03 | P13 | P23 | P33 |
| Third memory vector | P04 | P14 | P24 | P34 | P05 | P15 | P25 | P35 |
| Fourth memory vector | P06 | P16 | P26 | P36 | P07 | P17 | P27 | P37 |
| Fifth memory vector | P40 | P50 | P60 | P70 | P41 | P51 | P61 | P71 |
| Sixth memory vector | P42 | P52 | P62 | P72 | P43 | P53 | P63 | P73 |
| Seventh memory vector | P44 | P54 | P64 | P74 | P45 | P55 | P65 | P75 |
| Eighth memory vector | P46 | P56 | P66 | P76 | P47 | P57 | P67 | P77 |

Step 3 of Table 9 performs, with unit size 4, the transposition operation between the first load memory vector and the fifth load memory vector, the transposition operation between the second load memory vector and the sixth load memory vector, the transposition operation between the third load memory vector and the seventh load memory vector, and the transposition operation between the fourth load memory vector and the eighth load memory vector. Table 6 illustrates the load memory vector state similarly to the first embodiment after performing step 3 of Table 9.

The image rotation apparatus 100 stores the load memory vector in reverse order at step 630. That is, the upward and downward order of the load memory vector of Table 6 are exactly reversed and stored again. Table 7 illustrates the load memory vector state, similarly to the first embodiment, after performing step 630. The size of the image in this example is 8×8, but as explained in the second embodiment, it is clear to those skilled in the art that any original image of $2^n \times 2^n$ for all natural n greater than 1 may be used.

The third embodiment is described in detail below.

Firstly, in an interleaving repetition step, the interleaving operation unit 154 matches each load memory vector with the load memory vector which is delayed as much as $2^0$ (i.e., immediately successive load memory vector) from the most precedent load memory vector, and performs the interleaving operation between the matched load memory vector. At this time, the load memory vector which is matched with another load memory vector is not matched again with the other load memory vector.

Then, in the transposition repetition step, each load memory vector is matched with the load memory vector which is delayed as much as unit size from the most precedent load memory vector, and the transposition operation between the matched load memory vector is repeated. At this time, the load memory vector which is already matched with another load memory vector is not matched again with the other load memory vector.

Furthermore, the unit size is $2^k$. When the transposition step is repeated, k is initialized to 1 and increased by 1 with each iteration of transposition step. The iteration of transposition step is stopped after performing the transposition operation having k=n−1. Table 12 shows the process of rotating the original image of $2^n \times 2^n$ according to the third embodiment of the present invention.

TABLE 12

| | |
|---|---|
| Step 1 | interleaving operation by matching vector below $2^0$ |
| Step 2 | transposition operation with unit size $2^1$ by matching vector below $2^1$ |
| . . . | . . . |
| Step n − 1 | transposition operation with unit size $2^{n-2}$ by matching vector below $2^{n-2}$ |
| Step n | transposition operation with unit size $2^{n-1}$ by matching vector below $2^{n-1}$ |

Table 13 illustrates when n=3 in Table 12 (i.e., when applied to data of Table 1).

TABLE 13

| | |
|---|---|
| Step 1 | interleaving operation by matching vector below $2^0$ |
| Step 2 | transposition operation with unit size $2^1$ by matching vector below $2^1$ |
| Step 3 | transposition operation with unit size $2^2$ by matching vector below $2^2$ |

Step 1 of Table 13 performs the interleaving operation between the first load memory vector and the second load memory vector, the interleaving operation between the third load memory vector and the fourth load memory vector, the interleaving operation between the fifth load memory vector and the sixth load memory vector, and the interleaving operation between the seventh load memory vector and the eighth load memory vector. In other words, the interleaving operation is performed by matching a load memory vector with a counterpart which is just below. Table 14 illustrates the load memory vector state after performing step 1 of Table 13 with respect to the data of Table 1.

TABLE 14

| | | | | | | | | |
|---|---|---|---|---|---|---|---|---|
| First memory vector | P00 | P10 | P01 | P11 | P02 | P12 | P03 | P13 |
| Second memory vector | P04 | P14 | P05 | P15 | P06 | P16 | P07 | P17 |
| Third memory vector | P20 | P30 | P21 | P31 | P22 | P32 | P23 | P33 |
| Fourth memory vector | P24 | P34 | P25 | P35 | P26 | P36 | P27 | P37 |
| Fifth memory vector | P40 | P50 | P41 | P51 | P42 | P52 | P43 | P53 |
| Sixth memory vector | P44 | P54 | P45 | P55 | P46 | P56 | P47 | P57 |
| Seventh memory vector | P60 | P70 | P61 | P71 | P62 | P72 | P63 | P73 |
| Eighth memory vector | P64 | P74 | P65 | P75 | P66 | P76 | P67 | P77 |

Step 2 of Table 13 performs, with unit size 2, the transposition operation between the first load memory vector and the third load memory vector, the transposition operation between the second load memory vector and the fourth load memory vector, the transposition operation between the fifth load memory vector and the seventh load memory vector, and the transposition operation between the sixth load memory vector and the eighth load memory vector. In other words, the transposition operation is performed by matching a load memory vector with a counterpart which is smaller as much as two with unit size 2. Table 15 illustrates the load memory vector state after performing step 2 of Table 13.

TABLE 15

| | | | | | | | | |
|---|---|---|---|---|---|---|---|---|
| First memory vector | P00 | P10 | P20 | P30 | P02 | P12 | P22 | P32 |
| Second memory vector | P01 | P11 | P21 | P31 | P03 | P13 | P23 | P33 |
| Third memory vector | P04 | P14 | P24 | P34 | P06 | P16 | P26 | P36 |
| Fourth memory vector | P05 | P15 | P25 | P35 | P07 | P17 | P27 | P37 |
| Fifth memory vector | P40 | P50 | P60 | P70 | P42 | P52 | P62 | P72 |
| Sixth memory vector | P41 | P51 | P61 | P71 | P43 | P53 | P63 | P73 |
| Seventh memory vector | P44 | P54 | P64 | P74 | P46 | P56 | P66 | P76 |
| Eighth memory vector | P45 | P55 | P65 | P75 | P47 | P57 | P67 | P77 |

Step 3 of Table 13 performs, with unit size 4, the transposition operation between the first load memory vector and the fifth load memory vector, the transposition operation between the second load memory vector and the sixth load memory vector, the transposition operation between the third load memory vector and the seventh load memory vector, and the transposition operation between the fourth load memory vector and the eighth load memory vector. Table 6 illustrates the load memory vector state similarly to the first embodiment and the second embodiment after performing step 3 of Table 13.

The image rotation apparatus 100 stores the load memory vector in reverse order at step 630. That is, the upward and downward order of the load memory vector of Table 6 are exactly reversed and stored again. Table 7 illustrates the load memory vector state, similarly to the first embodiment and the second embodiment, after performing step 630. The size of image in this example is 8×8, but it is clear to those skilled in the art that any original image of $2^n \times 2^n$ for all natural n greater than 1 may be used.

In the third embodiment, the number of the transposition operation is smaller than that of the first embodiment or the second embodiment, while the number of interleaving operations is larger than that of the first embodiment or the second embodiment. In a CPU where the performance of the transposition operation is faster than the performance of the interleaving operation, the first embodiment and the second embodiment can be more useful in comparison with the third embodiment. However, in some CPUs, the transposition operation can be efficiently performed only when the unit size is $2^{n-1}$. In this case, the third embodiment can be useful.

Figure 7:
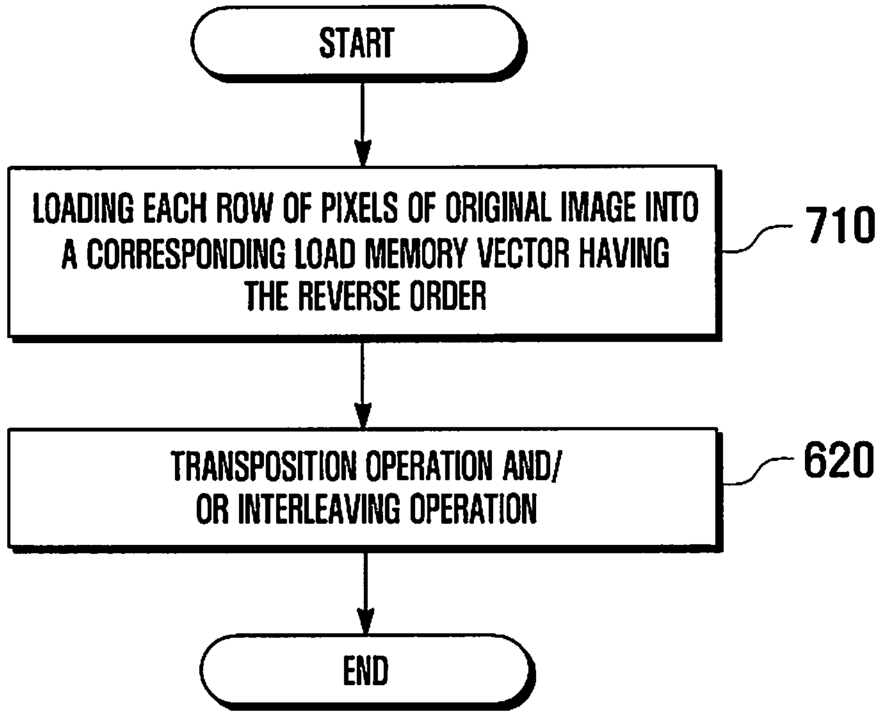
FIG. 7 is a flowchart illustrating an image rotation process according to another embodiment of the present invention.

FIG. 7 is a flowchart illustrating an image rotation process according to another embodiment of the present invention.

Referring to FIG. 7, the image rotation apparatus 100 loads each row of the pixel of the original image into a corresponding load memory vector having the reverse order in step 710. That is, the first row of the original image is loaded into the last memory vector, whereas the last row of the original image is loaded into the first memory vector. This process can be expressed in such a manner that each row of the original image is loaded in the reverse order after it is loaded order. The process illustrated at step 620 of FIG. 6 is performed.

In the process of FIG. 7, the process of changing the order of the load memory vector into reverse order is changed from after step 620 to before step 620. Through the embodiment of FIG. 7, the original image rotates 90 degrees clockwise. In the embodiment of FIG. 6, the original image was rotated counterclockwise. In the present invention, only the image of $2^n \times 2^n$ pixel is illustrated. An image which cannot be expressed by such a standard can be rotated after $2^n \times 2^n$ pixels are divided by unit to rotate and assemble again. The part remaining after the $2^n \times 2^n$ pixels are divided by unit may be rotated in another manner.

The image rotation apparatus according to an embodiment of the present invention can be implemented in a portable electronic instrument apparatus such as a mobile phone, a Personal Digital Assistant (PDA), the Navigation system, a digital broadcast receiver, a Portable Multimedia Player (PMP) or the like.

Although embodiments of the present invention have been described in detail above, it is clear to those skilled in the art that many variations and modifications of the basic inventive concepts herein taught will still fall within the spirit and scope of the present invention, as defined in the appended claims.

What is claimed is:

1. An image rotation method for rotating an original image of $2^n \times 2^n$ pixel when n is a natural number which is greater than 1, the method comprising:

loading each row of pixel of the original image into a corresponding load memory vector;

performing, for at least one iteration, a first grouping operation of grouping the load memory vectors into matched load memory vector pairs and a transposition operation for each matched load memory vector pair; and performing, after performing the at least one iteration of the first grouping and transposition operation, for zero or more iterations, a second grouping operation of grouping the load memory vectors into matched load memory vector pairs and an interleaving operation for each matched load memory vector pair, wherein a sum of the number of iterations of the first grouping operation and the transposition operation and the number of iterations of the second grouping operation and the interleaving operation is a total of n iterations.

2. The image rotation method of claim 1, wherein the operation step comprises:

an interleaving repetition step, after the load step, of n−1 iterations of the interleaving step of matching each load memory vector with a load memory vector which is delayed as much as $2^{n-2}$ from the most precedent load memory vector to form first matched load memory vector pairs and performing an interleaving operation for each first matched load memory vector pair; and a transposition step, after the interleaving repetition step, of performing matching each load memory vector with a load memory vector which is delayed as much as $2^{n-2}$ from the most precedent load memory vector to form second matched load memory vector pairs and performing a transposition operation for each second matched load memory vector pair.

3. The image rotation method of claim 1, wherein the operation step comprises:

a transposition repetition step, after the load step, of repeating a matching each load memory vector with a load memory vector which is delayed as much as $2^k$ from the most precedent load memory vector to form third matched load memory vector pairs and performing a transposition operation for each third matched load memory vector pair, while, when the transposition step is repeated, k is initialized to 0 and increased by 1 with each iteration of the transposition step and the iteration of the transposition step is stopped after performing the transposition operation having k=n−1.

4. The image rotation method of claim 1, wherein the operation step comprises:

an interleaving step, after the load step, of matching each load memory vector with an immediately successive load memory vector from the most precedent load memory vector to form fourth matched load memory vector pairs and performing an interleaving operation for each fourth matched load memory vector pair; and a transposition repetition step, after the interleaving step, of repeating a transposition step of matching each load memory vector with a load memory vector which is delayed as much as $2^k$ from the most precedent load memory vector to form fifth matched load memory vector pairs and performing the transposition operation for each fifth matched load memory vector pair, while, when the transposition step is repeated, k is initialized to 1 and increased by 1 with each iteration of transposition step and the iteration of the transposition step is stopped after performing the transposition operation having k=n−1.

5. The image rotation method of claim 1, wherein, in the operation step, the transposition operation is performed with a unit size $2^{n-1}$.

6. The image rotation method of claim 1, further comprising storing the load memory vector in reverse order after the operation step or between the load step and the operation step.

7. The image rotation method of claim 1, wherein the transposition operation performed with respect to a matched load memory vector pair, which comprises a first transposition memory vector and a second transposition memory vector, is an operation that swaps and stores the second memory element of a memory element pair of arbitrary location of the first transposition memory vector with the first memory element of the memory element pair of location corresponding to the arbitrary location of the second transposition memory vector, when each memory vector is a vector which includes $2^n$ memories that store pixel data, a memory element is a collection of memory dividing a memory vector by size unit corresponding to a unit size $2^i$, where i is an integer ranging from 0 less than n, and a memory element pair is a memory element paired in order.

8. The image rotation method of claim 7, wherein the interleaving operation of a first interleaving memory vector and a second interleaving memory vector is an operation that inserts pixel data of each memory of a corresponding location of the second interleaving memory vector behind the pixel data of each memory of the first interleaving memory vector and storing over the first interleaving memory vector and the second interleaving memory vector.

9. The image rotation method of claim 8, wherein a load memory vector which is already matched with another load memory vector is not matched again with the other load memory vector in each interleaving step, and a load memory vector which is already matched with another load memory vector is not matched again with the other load memory vector in the transposition step.

10. An image rotation apparatus for rotating an original image of $2^n \times 2^n$ pixel when n is a natural number greater than 1, the apparatus comprising:

a load memory vector for storing each row of pixels of the original image; and a controller for loading the pixels f the original image into a corresponding load memory vector, performing, for at least one iteration, a first grouping operation of grouping the load memory vectors into matched load memory vector pairs and a transposition operation for each matched load memory vector pair, and performing, after performing the at least one iteration of the first grouping and transposition operation, for zero or more iterations, a second grouping operation of grouping the load memory vectors into matched load memory vector pairs and an interleaving operation for each matched load memory vector pair, wherein a sum of the number of iterations of the first grouping operation and the transposition operation and the number of iterations of the second grouping operation and the interleaving is a total of n iterations.

11. The image rotation apparatus of claim 10, wherein the controller comprises:

an interleaving operation unit repeating n−1 iterations an interleaving step of matching each load memory vector with a load memory vector which is delayed as much as $2^{n-2}$ from the most precedent load memory vector to form first matched load memory vector pairs and performing an interleaving operation for each first matched load memory vector pair, after the pixels of the original image are stored in the load memory vector; and a transposition operation unit performing transposition operation of matching each load memory vector with a load memory vector which is delayed as much as $2^{n-2}$ from the most precedent load memory vector to form second matched load memory vector pairs and performing a transposition operation for each second matched load memory vector pair, after the interleaving operation of the interleaving operation unit is repeated n−1 iterations.

12. The image rotation apparatus of claim 10, wherein the controller comprises:

a transposition operation unit repeating, after the load step, a transposition step of matching each load memory vector with a load memory vector which is delayed as much as $2^k$ from the most precedent load memory vector to form third matched load memory vector pairs and performing a transposition operation for each third matched load memory vector pair, while stopping the iteration of the transposition step after performing the transposition operation having k=n−1, when the transposition step is repeated, k is initialized to 0 and increased by 1 with each iteration of the transposition step.

13. The image rotation apparatus of claim 10, wherein the controller comprises:

an interleaving operation unit matching each load memory vector with an immediately successive load memory vector from the most precedent load memory vector to form fourth matched load memory vector pairs and performing an interleaving operation for each fourth matched load memory vector pair, after the load step; and a transposition operation unit repeating a transposition step of matching each load memory vector with a load memory vector which is delayed as much as $2^k$ from the most precedent load memory vector to form fifth matched load memory pairs and performing transposition operation for each fifth matched load memory vector pair, while stopping iteration of the transposition step after performing the transposition operation having k=n−1, when the transposition step is repeated k initialized to 1 and increased by 1 with each iteration of the transposition step, after the interleaving step.

14. The image rotation apparatus of claim 10, wherein the controller performs the transposition operation with a unit size $2^{n-1}$.

15. The image rotation apparatus of claim 10, wherein the load memory vector is stored in reverse order after the performance of the transposition step and the interleaving step of the controller, or before the performance of the transposition step and the interleaving step of the controller after storing each row of pixels of the original image in the load memory vector.

16. The image rotation apparatus of claim 10, wherein the transposition operation performed with respect to a matched load memory vector pair, which comprises a first transposition memory vector and a second transposition memory vector, is an operation that swaps and stores the second memory element of a memory element pair of arbitrary location of the first transposition memory vector with the first memory element of the memory element pair of location corresponding to the arbitrary location of the second transposition memory vector, when each memory vector is a vector which includes $2^n$ memories that store pixel data, a memory element is a collection of memory dividing a memory vector by size unit corresponding to a unit size $2^i$, where i is an integer ranging from 0 to less than n, and a memory element pair is a memory element paired in order.

17. The image rotation apparatus of claim 16, wherein the interleaving operation of a first interleaving memory vector and a second interleaving memory vector is an operation that inserts pixel data of each memory of a corresponding location of the second interleaving memory vector behind the pixel data of each memory of the first interleaving memory vector and storing over the first interleaving memory vector and the second interleaving memory vector.

18. The image rotation apparatus of claim 17, wherein a load memory vector which is already matched with another load memory vector is not matched again with the other load memory vector in the interleaving step by the interleaving operation unit, and a load memory vector which is already matched with another load memory vector is not matched again with the other load memory vector in the transposition operation by the transposition operation unit.

* * * * *